(12) United States Patent
Nakonechny et al.

(10) Patent No.: US 11,700,498 B2
(45) Date of Patent: *Jul. 11, 2023

(54) ANALOG AUDIO PATCHBAY UNDER DIGITAL CONTROL

(71) Applicant: FLOCK AUDIO INC., Kelowna (CA)

(72) Inventors: Darren Nakonechny, Edmonton (CA); Curtis Figley, Edmonton (CA); Andrei Chichak, Edmonton (CA)

(73) Assignee: FLOCK AUDIO INC., Kelowna (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,725

(22) Filed: Jul. 6, 2022

(65) Prior Publication Data

US 2022/0345840 A1 Oct. 27, 2022

Related U.S. Application Data

(63) Continuation of application No. 16/718,434, filed on Dec. 18, 2019, now Pat. No. 11,438,719.

(60) Provisional application No. 62/781,392, filed on Dec. 18, 2018.

(51) Int. Cl.
*H04S 7/00* (2006.01)
*H01R 9/24* (2006.01)
*H04S 3/00* (2006.01)

(52) U.S. Cl.
CPC ............ *H04S 7/30* (2013.01); *H01R 9/2408* (2013.01); *H04S 3/002* (2013.01); *H04R 2420/03* (2013.01)

(58) Field of Classification Search
CPC ........ H04R 2420/01; H04R 5/04; H04R 3/12; H04R 2227/005; H04H 60/04; H01R 29/00; H03F 3/181; H03G 3/3005; H04L 12/2838

See application file for complete search history.

(56) References Cited

U.S. PATENT DOCUMENTS

| 5,757,941 | A   | * | 5/1998  | McMillen | H04H 60/04 381/119 |
| 2011/0081802 | A1 | * | 4/2011  | Knepp    | H04H 60/04 439/540.1 |
| 2012/0309310 | A1 | * | 12/2012 | Greuet   | H04B 5/0031 455/41.1 |

OTHER PUBLICATIONS

Rod Elliott, "Balanced Line Driver & Receiver", Elliott Sound Products, Project 51, (1999), pp. 1-5. (Year: 1999).*
Flock Audio, "Flock Audio: Introducing the PATCH System (Pro Audio Announcement)", YouTube video, Nov. 28, 2017, https://www.youtube.com/watch?v=k9mS4OMtYvY (Year: 2017).*

* cited by examiner

*Primary Examiner* — Kile O Blair
(74) *Attorney, Agent, or Firm* — Squire Patton Boggs (US) LLP

(57) ABSTRACT

The present invention provides for an analog audio patchbay comprising a first plurality of connectors capable of receiving a plurality analog electronic signals, a second plurality of connectors capable of transmitting a plurality of analog electronic signals, and a circuit board extending from the first plurality to the second plurality.

6 Claims, 2 Drawing Sheets

ANALOG AUDIO PATCHBAY UNDER DIGITAL CONTROL

FIELD OF THE INVENTION

The present invention relates to devices and assemblies for audio patch panel systems. More particularly the present invention relates to an audio patch panel capable of providing analog signal control by digital means without the need for analog to digital signal conversion.

BACKGROUND OF THE INVENTION

All of the publications, patents and patent applications cited within this application are herein incorporated by reference in their entirety to the same extent as if the disclosure of each individual publication, patent application or patent was specifically and individually indicated to be incorporated by reference in its entirety.

Patch panels are generally used to provide connectivity, and interconnectivity, between elements in electronic communication with each other; and more particularly audio patch panels are used to provide interconnectivity between systems capable of producing, modifying or recording electronic signals generally convertible to and from audible information (audio signals). Conventional interconnectivity on a patch panel is provided through interconnecting circuitry that includes jacks for receiving cables, which are then directed to other components either directly from the patch panel or indirectly through the re-entry of the signal into the patch panel before direction to a distant device.

Conventional patch panels (or a "patchbay"), though common in the industry, suffer from the need to physically connect, and disconnect, patch cables between inputs and outputs; such connections resulting in wear on the connective elements (particularly on the interfaces between circuitry requiring temporary physical contact). This wear can result in the reduction of the fidelity of the signal passing through the electronic connections, increase of artifacts within the electronic signal passing through the connection (generally referred to as "noise" in the art) or complete failure of the connection. Therefore reduction of the need to physically interconnect circuitry would be of a benefit to the art.

Further, an audio studio commonly includes a multiplicity of recording devices, audio signal generators or audio processors from which an audio engineer selects connections, and settings within the device, in order to achieve a desired result. Many audio devices provide electronic means to store and duplicate settings within the device; yet the implementation of such components in the chain of audio signals itself can affect the audio signal provided from, or through, the conventional patch panel. Further the exact settings of each device may affect the signal itself; and the order of their incorporation into a chain of audio processing signals, communicating through conventional patch panels, can be impact the resulting audio signal. Therefore, the order or interconnectivity through conventional patch panels can be critical to maintaining, or recreating, a desired audio result by an audio engineer.

This has been addressed by the art through processing of analog audio signals into digital representations, which allows purely electronic transformations, duplications, and connectivity which can then be transformed back into an analog audio signal; or maintained as a digital representation for storage, manipulation or communication. This can be implemented into a corollary of an analog audio patch panel, which allows similar manipulations as with an analog audio patch panel (a "digital patch panel"). This allows fast and easy manipulation of the digital information, representing a correlation to a switching, or duplication, of an analog signal under a conventional audio patch panel; the manipulations of the digital representation advantageously itself under digital control, with significant benefits to the easy storage and implementation of interconnectivity settings on the digital patch panel. The transformation of the analog signal to a digital representation is known to impose artifacts in the sound, and audio engineers report differences in the quality or nature of the sound; therefore the digital to audio conversion can be considered disadvantageous.

The prior art has described digital control of analog signals, for example U.S. Pat. No. 9,998,244 by Gebauer et al., through utilization of a multiplicity of switches controlling entry of an audio analog electrical signal into a variable amplifier; wherein the variable amplifier is under digital control by way of a microcontroller or computer. Though enabling digital control of an analog signal; the prior art has suffered from the disadvantage of limited or complete inability to duplicate input audio signals through multiple output channels; as well as direct connectivity between input and output channels, which can result in signal attenuation through application of loads, for example by use of further audio processing devices, following the output connections.

Therefore the art is in need of a patch panel system capable of providing interconnectivity between analog audio components which does not require as frequent manipulation of physical connections.

There is a further need in the present art to provide storage and implementation of interconnectivity settings digitally, while maintaining an analog signal throughout the patch panel, without need to convert the analog signal to a digital representation for manipulation.

SUMMARY OF THE INVENTION

To address the limitations of the prior art, the present invention provides for an analog audio patchbay comprising a plurality of input connectors capable of receiving a plurality analog electronic signals, a plurality of output connectors capable of transmitting a plurality of analog electronic signals, and an audio control circuit extending from the plurality of input connectors to the plurality of output connectors; wherein the audio control circuit comprises a multiplicity of balanced receiver modules; at least one crosspoint module, at least one microcontroller module and a multiplicity of balanced driver modules; each of the input connectors in direct electronic communication with a balanced receiver module such that there is a one to one correlation of the plurality of input connectors to a balanced receiver module; the crosspoint module comprises a multiplicity of inputs, a multiplicity of outputs, and the ability of any one of the multiplicity of outputs to receive an analog signal from one of the multiplicity of inputs, all under the control of a digital microcontroller; each of the balanced receiver modules in direct electronic communication with one input on the crosspoint module; each of the outputs of the crosspoint module in direct electronic communication with one balanced driver module; each of the balanced driver modules in direct electronic communication with an output connector such that there is a one to one correlation of the plurality of output connectors to a balanced driver module; with the crosspoint module under digital control of the microcontroller module.

In one embodiment the first plurality of input connectors comprise four DB25 connectors, each DB25 connector configured to connect to eight balanced audio channels.

In another embodiment the plurality of output connectors comprise four DB25 connectors, each DB25 connector configured to connect to eight balanced audio channels.

In another embodiment the microcontroller module is in digital communication with a computer.

In another embodiment each of the multiplicity of receiver modules comprise, at least, a differential receiver, electrostatic discharge protection and circuitry to optionally provide up to a 48V phantom power for audio devices connecting to at least one of the plurality of input connectors.

In another embodiment each of the multiplicity of receiver modules comprise, at least, a differential receiver, electrostatic discharge protection and circuitry to optionally provide up to a 48V phantom power for audio devices connecting to at least one of the plurality of output connectors.

In another embodiment each of the multiplicity of receiver modules comprise, at least, a differential receiver, electrostatic discharge protection and circuitry to optionally provide up to a 48V phantom power for audio devices connecting to at least one of the plurality of input connectors and at least, a differential receiver, electrostatic discharge protection and circuitry to optionally provide up to a 48V phantom power for audio devices connecting to at least one of the plurality of output connectors.

DETAILED DESCRIPTION OF THE PRESENT INVENTION

Figure 1:
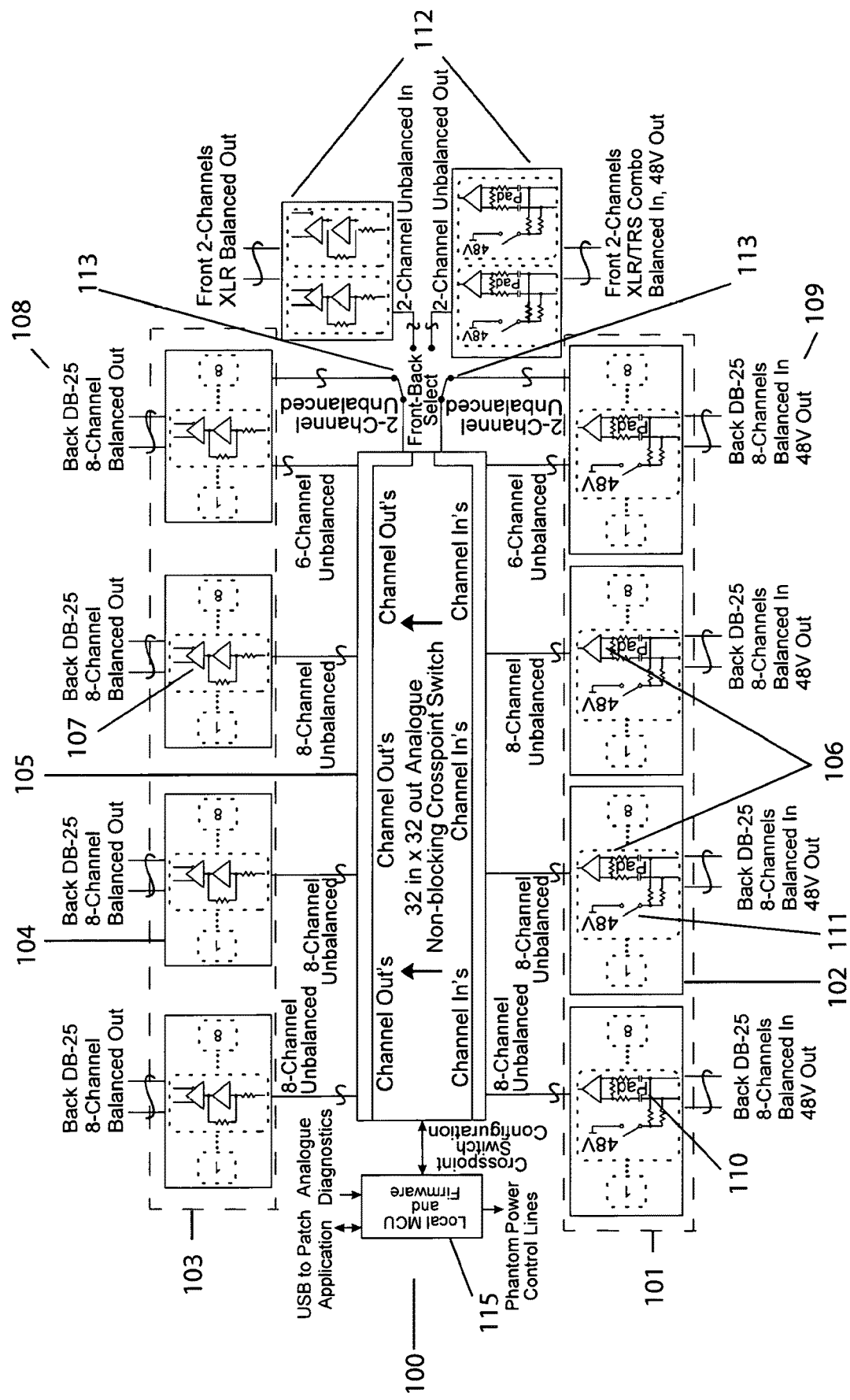
FIG. 1. shows a schematic of the analog patchbay of the present invention, and select novel features of same.

As used herein "computer" means any device with suitable processing, communication and input/output capability to provide instructions to a microcontroller module through digital communication means. Although not intended to be limiting, a computer generally comprises a general purpose hardware processor and/or special purpose hardware processor, a memory such as a random access memory or hard drive, and a means to communicate externally to itself either in the form of at least one input connection to receive instructions (via a second memory or a keyboard, for example), and at least one output (such as a serial or parallel communications port and/or a display monitor, for example).

As used herein "analog signal" means the continuous modulation of an electronic value, typically a voltage. An analog audio signal means an analog signal being used to communicate audio information, such as music or speech, preferably sounds within the range of human hearing of 20 Hz to 20 kHz.

As used herein, the term "receiver" means hardware configured for receiving an analog signal with or without a differential amplifier operating on a unity, above unity, or below unity amplification.

A used herein, the term "driver" means hardware for transmitting an analog signal with or without a differential amplifier operating on a unity, above unity, or below unity amplification.

As used herein, the term "microcontroller" refers to a single integrated circuit containing a processor core, memory, and programmable input/output peripherals.

The term "module" refers broadly to locally executed software, hardware, or firmware components (or any combination thereof). Modules are typically functional components that can generate useful data or electronic signals using specified input(s) and in the context of the present invention is used to refer to a collection of electronic components which are assembled into a functional unit.

As used herein, "hot" means the in-phase wire carrying an electronic signal by way of a variation in electrical value (such as voltage over time); while "cold" refers to the corresponding phase-inverted electronic signal.

The present invention provides for an analog audio patchbay capable of accepting a plurality of audio channels as an input and then providing those audio channels through to a plurality of outputs, all at the election or instruction of a user; under digital control via a microcontroller, directly, or computer, indirectly, and all while maintaining their analog nature. This provides for a novel device for use in, by way of non-limiting examples, audio studios, audio production facilities, live music venues, or any place where receipt and redirection of multiple analog audio channels is desirable.

Although the invention provided for in the present disclosure accepts and transmits through 32 channels, the present invention contemplates any multiplicity of inputs and outputs. It is well known in the art how to implement multiple crosspoint chips, as described herein, to achieve a desired number of inputs and outputs; and implementation of the novel combination of receiver and driver modules, in advance of and following crosspoint chip inputs and outputs respectively, as disclosed herein, will allow implementation of devices of the present invention with input and output channels of the desired combination.

FIG. 1 shows an analog audio patchbay of the present invention is constructed around a 32 input 101, 32 output 103, non-blocking analogue crosspoint switching assembly; the assembly comprising four 16×16 analog crosspoint switches (not shown, represented by module 105, Model AD-8113, Analog Devices, Massachusetts USA). In a preferred embodiment, each crosspoint switch input channel is fed by an output from balanced receiver module 102 containing a fixed balanced to unbalanced receiver 106 (often referred to as a differential amplifier in the art, operating at an amplification of less than unity) configured to accept as input conventional balanced signals through wired connections from external audio equipment 109. In most cases, each output channel from the crosspoint switch is connected to fixed balanced driver module 104 containing an unbalanced to balanced driver (often referred to as a differential amplifier in the art, operating at an amplification of greater than unity) 107 which can drive audio signals to distant inputs on external audio equipment through balanced outputs 108. Connections to the external equipment may be provided on any facing surface of the patchbay unit, but in a preferred embodiment the inputs and outputs are provided on the rear of the patchbay to simplify cable management issues in rack mounting situations.

For the sake of clarity, each of the 4 blocks 102 within 32 input module 101, provided for illustrative purposes, contains 8 circuit arrangements comprising optional phantom power module 111, balanced to unbalanced receiver module 106, and Electrostatic Discharge (ESD) protection module 114.

The crosspoint switch 105 is under the control of microcontroller module 115, which may be further under the control of, and in digital communication with, a computer (not shown). This allows the computer in digital communication with the microcontroller to provide pre-set settings and commands so as to allow the microcontroller to duplicate pre-established control settings.

Although, in a preferred embodiment, the fixed balanced input drivers (receivers) accept balanced audio signals, they may also accept unbalanced signals with little loss in audio performance with the exception of the corresponding reduction in headroom that the unbalanced signal implies. Similarly, the fixed balanced output drivers may be connected to unbalanced loads with little loss in audio performance, beyond a reduction in peak-to-peak signal headroom.

Phantom power is provided through phantom power module 111 for each of 8 inputs as part of receiver modules 102. This feature is useful to energize external amplified microphones and other phantom powered equipment found in audio recording applications. As each input is treated the same, there are no special limitations on which channels can be used for these purposes as long as the net current maximum draw rating is observed. This phantom power can be individually enabled or disabled on each input 111. Phantom power is nominally 48 VDC (unloaded) and is separately impedance limited by roughly 7 kOhm on each channel so that overloading or shorting one channel does not unduly affect other phantom power channels.

Figure 2:
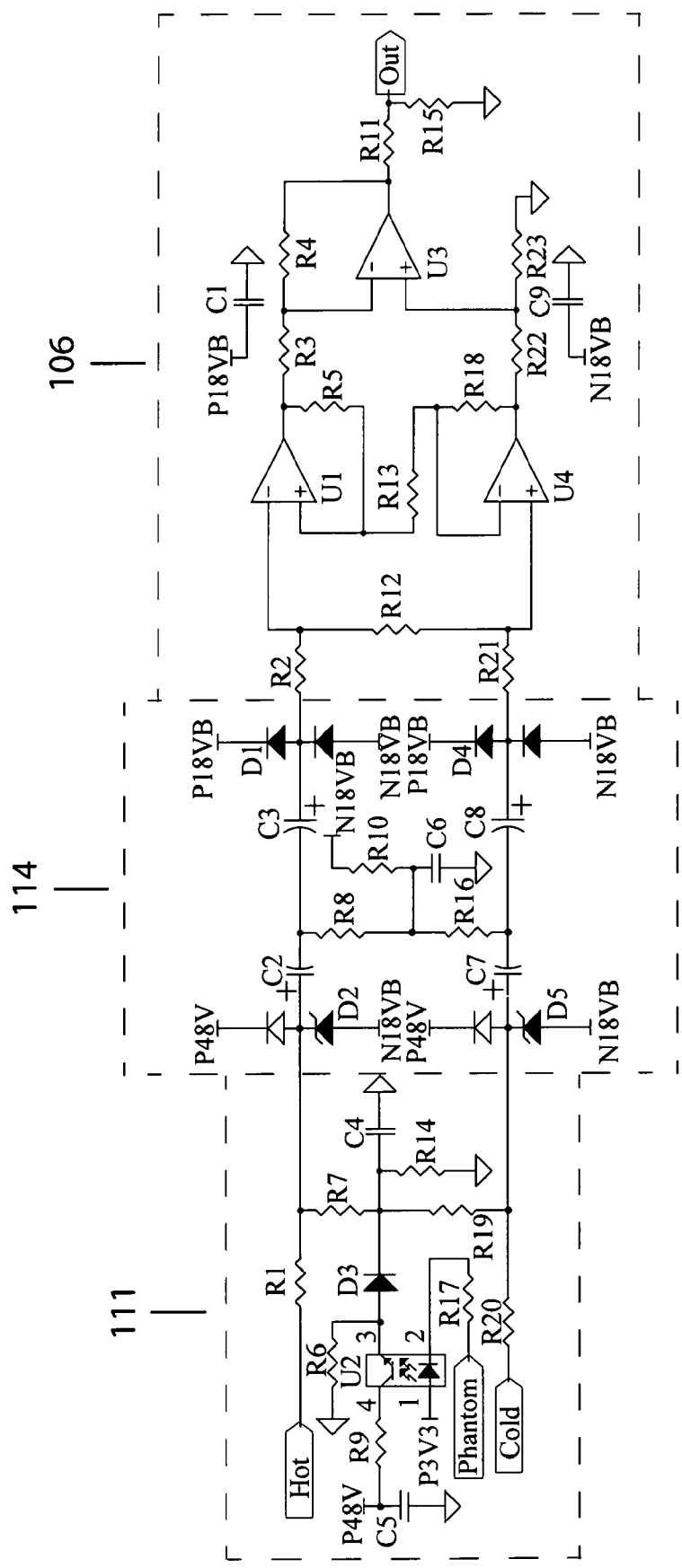
FIG. 2. shows a first embodiment of an audio control circuit of three modules forming part of the present invention.

FIG. 2 shows one typical channel of balanced (differential) audio input signal to unbalanced (single ended) signal conversion that includes the ability to optionally supply phantom power to the upstream signal generating or processing equipment, commonly but not exclusively preamps or microphones. Indicated supply voltages are for illustration only: alternate values may be used in other embodiments without affecting the intent of this design. Ground or common signal levels are at the same potential as the downstream crosspoint circuitry.

Phantom power module 111, via integrated circuit U2, provides a switching mechanism to connect or disconnect the main 48 volt phantom power source from this channel. This is shown as an optically coupled bipolar junction transistor, but could also be a MOSFET enabled solid state relays such as a photoMOS relay, a mechanical relay or another controlled switch known to the art.

Resistor R9 in combination with resistors R7 and R1 on the "hot" side, and resistors R19 and R20 on the "cold" side of an incoming balanced signal; provide an impedance limited DC bias power path out to both the hot and cold input signal lines. Impedance limiting is used as a safety feature to limit the available current in the event of a wiring misconnection or equipment fault in the upstream electronic equipment. Resistors R6 and R7 are provided as bleeders on the output side of integrated circuit U2 and the common mode of the hot and cold signal lines, and further diode D3 is provided to protect integrated circuit U2 from damage if the external inputs attempt to apply their own bias voltages into the inputs. Capacitors C4 and C5 act in filter roles for the phantom power.

FIG. 2. shows module 114 for providing electronic protection to the modules, crosspoint chips and circuits provided for in the present invention. Diodes D2 and D5 in conjunction with resistors R1 and R20 respectively, act as input voltage clamps for electrostatic discharge and excessive signal levels at the hot and cold inputs. Diodes D2 and D5 can be constructed as series connected diode pairs, with the appropriate terminals biased to high and low clamping voltages (as indicated by the power supply connections and the dotted outline for the topmost diode in the figure), or as transient voltage suppressing devices, or as biased zener diodes as shown in the figure, or through other means known to the art. To that end, the topology used should have very high impedance at normal signal levels and low impedance at excess voltages, to effect the protection function in fault cases without unduly loading the input signal lines under normal conditions.

Back to back capacitor pairs C2-C3 and C7-C8 are used to effect a non-polar capacitor, with electrolytic type capacitors preferred due to their superior audio characteristics such as near zero capacitance voltage coefficients. The bipolar arrangement is used to allow AC coupling of larger signal levels. In the topology shown, the common connection of resistors R8 and R16 is biased to the system negative power rail voltage via resistor R10, filtered by capacitor C6. The negative bias conveyed through resistors R8 and R16 to the respective common connections between capacitors C2-C3 and C7-C8 ensures that each of those capacitors is never reverse biased for an extended duration in normal use. This enhances capacitor component lifetime and is seen as a superior method here compared to using conventional integrated construction bipolar capacitors where continuous DC bias in one direction can lead to electrode degradation issues of the capacitor being steadily reverse biased. This is of particular concern in this application since the 48V phantom power can polarize the corresponding capacitor pairs C2-C3 and C7-C8 in one direction for long periods of time. Diodes D1 and D4 are provided as additional ESD suppression devices.

A receiver module 102 comprises balanced receiver circuitry 106 (containing, at a minimum differential amplifier) for optionally providing phantom power for audio components providing the input analog audio signal, and an electronic means for reducing the voltage of the received analog signal (pad, 110) to the appropriate input voltage for the downstream crosspoint chip. The voltage required will vary depending on the crosspoint chip utilized, in the case of the Model AD-8113 crosspoint chip used as an example in the present disclosure, the voltage is reduced to +/−12V. The balanced outputs from the balanced driver module are monitored for the presence of common mode voltages during operation. If high common mode voltages are detected, a warning may be sent to the operator indicating such as this may cause signal distortion and introduce noise in the output. Absent this warning, the operator may not recognize that cabling problems, ground loops, or backpowering issues exist.

FIG. 2. shows an exemplary circuit diagram of balanced receiver circuitry 106, with resistors R2, R12 and R21 provided to attenuate (often referred to as a "pad") the signal inputs to a range acceptable for the differential input amplifier notionally represented by integrated circuit amplifiers U1, U3 and U4 and resistors R5, R13, R18, R3, R22, R4 and R23. This type of instrumentation amplifier topology is shown for illustration only, other balanced (differential) to unbalanced (single ended) conversion configurations are known to the art and may be used to effect similar overall circuit behaviour. Resistors R11 and R15 form a single ended attenuator to allow another opportunity to adjust the signal amplitude to downstream circuits.

Noise and noise propagation through this circuit topology is a concern in general, and is dealt with by arranging the various gains, attenuations, and system voltages in manners known to the art. These are managed in the design of the circuit by physical placement of the circuit elements, so as to allow the desired input signal range (headroom) specification to coexist with the acceptable noise floor to provide an overall dynamic range that is useful in this type of equipment.

In one embodiment of the present invention, two channels, 112, are specially configured to alternatively, and under the control of switching equipment 113, accept inputs or provide outputs, such channels located on either the front or rear of the patchbay unit. In these cases, two of the crosspoint switch channels are provided with an input source selector and an output load selector that can be independently set to use the front inputs, the front outputs, or the front inputs and outputs. The selection is done at the unbalanced crosspoint switch channel inputs and outputs 113, so the respective channels each have their corresponding balanced conversion stages.

The present invention provides the benefit that any combination of outputs can access an analog audio channel input simultaneously, all under digital control via the microcontroller 115, directly, or computer in digital communication with the microcontroller, indirectly. Given the arrangement of the channels under the control of the crosspoint chip, it is electronically possible to have multiple input channels directed to a single output channel, though in a preferred embodiment this is prevented through internal control mechanisms, either digitally controlled through the microcontroller module, the software control via the computer in digital communication with the microcontroller, or through circuit elements incorporated into the patchbay unit. This is implemented so as to prevent the unintentional blending of multiple input channels through a single output channel.

Through implementation of a computer in digital communication with the microcontroller, the configuration of routing of outputs to select inputs may be set, saved, edited, cleared or restored in quick fashion without physically modifying the any external cabling. This provides the operator with the ability to quickly compare alternate configurations, to restore previous setups and to save custom setups for particular use cases. In a studio recording, or audio production, setting this speeds work flow and makes for faster resets and turn arounds of the facilities.

The audio signals routed through the patchbay of the present invention are conveyed entirely on high linearity, low distortion analogue signal channels to provide as great a transparency of the signal as possible. Routing path selection is carried by digital means using a local microcontroller and firmware directed by an application running on a remote computer, however there are no analogue-to-digital or digital-to-analogue conversions carried out on the audio signals traversing through the crosspoint chip pathways.

The frequency response of the audio signal path is arranged to be quite wide compared to the nominal range of human hearing, along with it being flat to prevent increasing the power spectrum of noise, referred to as "colouring", of the audio signals of interest. Response into the subsonic and ultrasound regions helps preserve pristine signals for processing in external equipment.

The implementation of the differential amplifiers as part of the balanced receiver module 101 and balanced driver modules 103 provides unity gain buffering between the input analog signals and corresponding output analog signal. High impedance differential balanced inputs and low impedance differential balanced outputs are interconnected in the patchbay of the present invention with an overall pass through unity gain, when using conventional types of audio sources and loads. Furthermore, internal buffering ensures that the magnitude of the load on one output does not affect the signal amplitude on another output routed from the same input. This also mitigates back-feeding of noise or load induced distortion on a particular output from polluting sister outputs. This provides a distinct advantage over conventional hard contact types of connections provided by mechanical switches and relays or plug-in patch cable routers. In these other routing mechanisms connecting two or more outputs to one input typically result in a gain shifts due to multiple loads being applied to the driving source. By way of non-limiting example, conventional patchbays of the prior art with a 600 ohm source and using hardwired connections; connecting two 600 ohm loads would reduce the output amplitude by half, which would require adjustment of the gains in other equipment to recover the same amplitudes.

The patchbay of the present invention advantageously provides, through the novel selection and arrangement of the components as described herein, input common mode suppression and tolerates output common mode injection. Related to the input and output configuration of the patchbay, the balanced inputs provide a significant level of common mode suppression for balanced input signals that might be floating on top of undesired DC bias or that contain line frequency hum and other undesirable common mode effects. Similarly, the output drivers can operate into loads that may be trying to back-feed these types of signal contaminates. The patchbay of the present invention assists in the isolation and reduction of these problems.

A further benefit is that the patchbay of the present invention can be used to break up and isolate ground loops in complex cabling and equipment installations, unlike common hard contact patch panels that can often create ground loops. Ground loop isolation can be accomplished in conjunction with hard contact type patch panels by either raising the voltage of the signal ground reference connections, or by introducing isolation transformers. However, disadvantageously, these floating ground or transformer techniques can create or enhance other noise mechanisms, and in the case of transformers in particular, introduce frequency response issues that colour the desired audio signals.

Further, the patchbay of the present invention, through implementation of the exemplary crosspoint switch arrangement provided herein; enables the selection of any one input to be provided for on any one output; thereby allowing duplications of an analogue input, balanced or unbalanced, to a multiplicity of outputs. Given the use of a greater than unity amplifier prior to the output; the duplication of an input is without significant decrease of signal strength or quality by way of the duplication. The present invention contemplates any number of input channels, with increasing number of input channels requiring additional crosspoint switch modules; with the exemplary Model AD-8113 crosspoint chip providing 16 input and 16 outputs. By arrangement of a multiplicity of 16×16 crosspoint chips; the present invention provides for higher number of inputs and outputs, with a corresponding increase in the number of crosspoint switch elements, contained within a crosspoint chip; closely approximating N×M crosspoint switch elements, where N is equal to the number of inputs, M is equal to the number of outputs, and where N is greater to or equal to M.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. An analog audio patchbay comprising:
   i. A plurality of input connectors capable of receiving a plurality of analog electronic signals,
   ii. A plurality of output connectors capable of transmitting a plurality of analog electronic signals,
   iii. An audio control circuit extending from the plurality of input connectors to the plurality of output connectors,
   Wherein
      i. The audio control circuit comprises a multiplicity of fixed balanced receiver modules; at least one crosspoint module, at least one microcontroller module and a multiplicity of fixed balanced driver modules;
      ii. each of the connectors comprising the plurality of input connectors is in direct electronic communication with a fixed balanced receiver module such that there is a one to one correlation of the plurality of input connectors to a fixed balanced receiver module;
      iii. the crosspoint module comprises a multiplicity of inputs, a multiplicity of outputs, and the ability of any one of the multiplicity of crosspoint outputs to receive an analog signal from at least one of the multiplicity of crosspoint inputs, all under the control of a digital microcontroller;
      iv. each of the fixed balanced receiver modules is in direct electronic communication with an input on the crosspoint module;
      v. each of the outputs of the crosspoint module in direct electronic communication with a fixed balanced driver module;
      vi. each of the fixed balanced driver modules is in direct electronic communication with a connector comprising the plurality of output connectors such that there is a one to one correlation of the plurality of output connectors to a fixed balanced driver module, wherein each of the fixed balanced driver modules comprises
         a differential balanced driver;
         electrostatic discharge protection; and
         circuitry to optionally provide up to a 48V phantom power for audio devices connecting to at least one of the plurality of output connectors; and
      vii. the crosspoint module is under digital control of the microcontroller module.

2. The analog audio patchbay of claim 1 wherein the plurality of input connectors comprise four DB25 connectors, each DB25 connector configured to connect to eight audio channels.

3. The analog audio patchbay of claim 1 wherein the second plurality of connectors comprise four DB25 connectors, each DB25 connector configured to connect to eight audio channels.

4. The analog audio patchbay of claim 1 wherein the microcontroller module is in digital communication with a computer.

5. The analog audio patchbay of claim 1 wherein each of the multiplicity of receiver modules comprise, at least, a differential receiver, electrostatic discharge protection and circuitry to optionally provide up to a 48V phantom power for audio devices connecting to at least one of the plurality of input connectors.

6. The analog audio patchbay of claim 1 wherein each of the multiplicity of receiver modules comprise, at least, a differential receiver, electrostatic discharge protection and circuitry to optionally provide up to a 48V phantom power for audio devices connecting to at least one of the plurality of output connectors, and at least, a differential receiver, electrostatic discharge protection and circuitry to optionally provide up to a 48V phantom power for audio devices connecting to at least one of the plurality of input connectors.

* * * * *